United States Patent
Kim et al.

(10) Patent No.: US 10,497,940 B2
(45) Date of Patent: Dec. 3, 2019

(54) CARRIER-NANOPARTICLE COMPLEX AND PREPARATION METHOD THEREOF

(71) Applicant: LG CHEM, LTD., Seoul (KR)

(72) Inventors: Sang Hoon Kim, Daejeon (KR); Jun Yeon Cho, Daejeon (KR); Kwanghyun Kim, Daejeon (KR); Jungup Bang, Daejeon (KR); Gyo Hyun Hwang, Daejeon (KR); Ran Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 393 days.

(21) Appl. No.: 15/504,229

(22) PCT Filed: Aug. 18, 2015

(86) PCT No.: PCT/KR2015/008623
§ 371 (c)(1),
(2) Date: Feb. 15, 2017

(87) PCT Pub. No.: WO2016/028065
PCT Pub. Date: Feb. 25, 2016

(65) Prior Publication Data
US 2017/0279124 A1    Sep. 28, 2017

(30) Foreign Application Priority Data
Aug. 19, 2014  (KR) .................. 10-2014-0107953

(51) Int. Cl.
| | | |
|---|---|---|
| B01J 21/18 | (2006.01) | |
| B01J 23/16 | (2006.01) | |
| B01J 23/38 | (2006.01) | |
| B01J 23/70 | (2006.01) | |
| B01J 37/08 | (2006.01) | |
| B01J 37/16 | (2006.01) | |
| H01M 4/66 | (2006.01) | |
| H01M 8/02 | (2016.01) | |
| H01M 4/90 | (2006.01) | |

(52) U.S. Cl.
CPC ........ H01M 4/663 (2013.01); H01M 4/9075 (2013.01); H01M 8/02 (2013.01)

(58) Field of Classification Search
CPC . B01J 21/18; B01J 21/185; B01J 23/16; B01J 23/38; B01J 23/70; B01J 35/008; B01J 37/08; B01J 37/16; H01M 4/663; H01M 4/9075; H01M 4/925; H01M 8/02
USPC ........................................ 502/150, 182, 185
See application file for complete search history.

(56) References Cited

U.S. PATENT DOCUMENTS

| | | |
|---|---|---|
| 7,229,942 B2 | 6/2007 | Suh et al. |
| 7,691,773 B2 | 4/2010 | Suh et al. |
| 9,517,450 B2 | 12/2016 | Cho et al. |
| 9,735,432 B2 | 8/2017 | Cho et al. |
| 2009/0291352 A1* | 11/2009 | Oshihara ............. H01M 4/8807 429/518 |

(Continued)

FOREIGN PATENT DOCUMENTS

| | | |
|---|---|---|
| KR | 10-2005-0094501 A | 9/2005 |
| KR | 10-0953545 B1 | 4/2010 |

(Continued)

*Primary Examiner* — Patricia L. Hailey
(74) *Attorney, Agent, or Firm* — Dentons US LLP (57) ABSTRACT

The present specification relates to a carrier-nanoparticle complex and a preparation method thereof.

17 Claims, 6 Drawing Sheets

(56) References Cited

U.S. PATENT DOCUMENTS

| | | | | |
|---|---|---|---|---|
| 2011/0081595 A1* | 4/2011 | Ueno | ................... | H01M 4/921 |
| | | | | 429/482 |
| 2014/0171297 A1* | 6/2014 | Goia | ..................... | B01J 23/892 |
| | | | | 502/185 |
| 2015/0314275 A1* | 11/2015 | Cho | ......................... | B82B 1/00 |
| | | | | 502/185 |
| 2016/0131609 A1* | 5/2016 | Yu | ......................... | H01G 11/30 |
| | | | | 429/221 |
| 2017/0194651 A1* | 7/2017 | Hellstrom | ............. | H01M 4/382 |

FOREIGN PATENT DOCUMENTS

| | | | |
|---|---|---|---|
| KR | 10-2013-0081130 A | 7/2013 | |
| KR | 10-2013-0126472 A | 11/2013 | |
| KR | 10-2014-0052271 A | 5/2014 | |
| KR | 10-2014-0085368 A | 7/2014 | |
| WO | 2014/104805 | * 7/2014 | ................ B22F 1/00 |

* cited by examiner

CARRIER-NANOPARTICLE COMPLEX AND PREPARATION METHOD THEREOF

TECHNICAL FIELD

This application is a National Stage Entry of International Application No. PCT/KR2015/008623, filed Aug. 18, 2015, and claims the benefit of and priority to Korean Application No. 10-2014-0107953, filed on Aug. 19, 2014, all of which are hereby incorporated by reference in their entirety for all purposes as if fully set forth herein.

The present specification relates to a carrier-nanoparticle complex and a preparation method thereof.

BACKGROUND ART

Carbon black is generally used as a support of a fuel cell catalyst. However, when carbon black is used as a support, there occurs a problem with the durability due to the corrosion of carbon.

In order to alleviate the problem, studies on carbon nanotube (CNT), carbon nanofiber (CNF), carbon nanocage (CNC), and the like, which are crystalline carbon forms having a high corrosion resistance, have been actively conducted. However, these crystalline carbon forms have a problem in that these carbon forms are not dispersed well in a polar solvent due to the strong surface water repellency thereof. For this reason, there is a problem in that platinum is agglomerated without being uniformly dispersed in the process of loading platinum into a carbon support.

CITATION LIST

Official Gazette of Korean Patent Application Laid-Open No.: 10-2005-0098818

DETAILED DESCRIPTION OF THE INVENTION

Technical Problem

The present specification provides a carrier-nanoparticle complex and a preparation method thereof.

Technical Solution

An exemplary embodiment of the present specification provides a carrier-nanoparticle complex including: one or more hollow metal nanoparticles including a hollow core and a shell portion which surrounds the hollow core; and a carbon-based carrier onto which the hollow metal nanoparticle is supported, in which at least a portion of a surface of the carrier is coated with a polymer electrolyte including one or more amine groups.

An exemplary embodiment of the present specification provides a method for preparing the carrier-nanoparticle complex, the method including: a carrier coating step of coating at least one region of a surface of a carbon-based carrier with a polymer electrolyte including one or more amine groups; a solution forming step of forming a solution by adding the carbon-based carrier and two or more metal precursors to a solvent; and a nanoparticle forming step of forming one or more hollow metal nanoparticles supported onto the carrier by adding a reducing agent to the solution.

An exemplary embodiment of the present specification provides a catalyst including the carrier-nanoparticle complex.

Advantageous Effects

A carrier-nanoparticle complex according to an exemplary embodiment of the present specification has an advantage in that the dispersibility of nanoparticles is excellent.

The carrier-nanoparticle complex according to an exemplary embodiment of the present specification has an advantage in that the thermal stability is excellent.

The carrier-nanoparticle complex according to an exemplary embodiment of the present specification includes hollow metal nanoparticles having a uniform size, and thus may exhibit uniform performance.

A method for preparing a carrier-nanoparticle complex according to an exemplary embodiment of the present specification may be prepared by a simple process, and thus has an advantage in that time and costs may be reduced.

The method for preparing a carrier-nanoparticle complex according to an exemplary embodiment of the present specification may solve problems of environmental pollution and high costs because an organic solvent may not be used.

BEST MODE

When one part "includes" one constituent element in the present specification, unless otherwise specifically described, this does not mean that another constituent element is excluded, but means that another constituent element may be further included.

Hereinafter, the present specification will be described in more detail.

An exemplary embodiment of the present specification provides a carrier-nanoparticle complex including: one or more hollow metal nanoparticles including a hollow core and a shell portion which surrounds the hollow core; and a carbon-based carrier onto which the hollow metal nanoparticle is supported, in which at least a portion of a surface of the carrier is coated with a polymer electrolyte including one or more amine groups.

The carrier-nanoparticle complex according to an exemplary embodiment of the present specification may be a catalyst.

According to an exemplary embodiment of the present specification, at least one hollow metal nanoparticle may be bonded to the amine group of the polymer electrolyte to be supported onto the carbon-based carrier.

According to the carrier-nanoparticle complex according to an exemplary embodiment of the present specification, it is possible to induce bonding of the amine group to the hollow metal nanoparticle by coating a region of the surface of the carrier with a polymer electrolyte including an amine group. Accordingly, the aggregation phenomenon of the hollow metal nanoparticles may be alleviated to enhance the dispersibility of the hollow nanoparticles.

According to an exemplary embodiment of the present specification, 50% to 100% of the surface of the carbon-based carrier may be coated with the polymer electrolyte. Specifically, according to an exemplary embodiment of the present specification, 75% to 100% of the surface of the carbon-based carrier may be coated with the polymer electrolyte.

The polymer electrolyte of the present specification may mean a polymer having electric charges. Specifically, the polymer electrolyte may be a synthetic polymer or ion exchange resin having electric charges.

According to an exemplary embodiment of the present specification, the shell portion of the hollow metal nanoparticle may include two or more metals. Specifically, according to an exemplary embodiment of the present specification, the shell portion of the hollow metal nanoparticle may be composed of an alloy of two or three metals as a main component. However, the shell portion of the hollow metal nanoparticle may include impurities in addition to the two or more metals.

Further, according to an exemplary embodiment of the present specification, the hollow metal nanoparticle does not include a metal oxide as a main component.

According to an exemplary embodiment of the present specification, the shell portion may include a first metal and a second metal, and a reduction potential of the second metal may be lower than a reduction potential of the first metal. A galvanic substitution reaction may occur due to the difference in reduction potentials between the first metal and the second metal, and as a result, hollows of the nanoparticles may be smoothly formed.

According to an exemplary embodiment of the present specification, the first metal may be a noble metal such as Pt, Pd, or Au, and the second metal may be a metal having a reduction potential lower than the reduction potential of the first metal. Further, according to an exemplary embodiment of the present specification, the second metal may be iron (Fe), cobalt (Co), nickel (Ni), tine (Sn), or copper (Cu).

According to an exemplary embodiment of the present specification, the hollow metal nanoparticles may have an average particle diameter of 30 nm or less. Specifically, according to an exemplary embodiment of the present specification, the hollow metal nanoparticles may have an average particle diameter of 20 nm or less. In addition, according to an exemplary embodiment of the present specification, the hollow metal nanoparticles may have an average particle diameter of 15 nm or less. According to an exemplary embodiment of the present specification, the hollow metal nanoparticles may have an average particle diameter of 10 nm or less.

According to an exemplary embodiment of the present specification, the hollow metal nanoparticles may have an average particle diameter of 1 nm to 5 nm.

The carrier-nanoparticle complex according to an exemplary embodiment of the present specification includes hollow metal nanoparticles having a uniform size, and thus may exhibit uniform performance.

According to an exemplary embodiment of the present specification, the average particle diameter of the hollow metal nanoparticles means a value obtained by using a graphic software (MAC-View) to measure the diameters of 200 or more hollow metal nanoparticles, and measuring an average particle diameter through a statistical distribution obtained.

According to an exemplary embodiment of the present specification, the hollow metal nanoparticles may have a particle diameter of 30 nm or less. Specifically, according to an exemplary embodiment of the present specification, the hollow metal nanoparticles may have a particle diameter of 20 nm or less. Furthermore, according to an exemplary embodiment of the present specification, the hollow metal nanoparticles may have a particle diameter of 15 nm or less. According to an exemplary embodiment of the present specification, the hollow metal nanoparticles may have a particle diameter of 10 nm or less.

According to an exemplary embodiment of the present specification, the hollow metal nanoparticles may have a particle diameter of 1 nm or more or 5 nm or more.

According to an exemplary embodiment of the present specification, the hollow metal nanoparticle may have a spherical shape. Specifically, the shape of the shell portion of the hollow metal nanoparticle may be a spherical shape including a hollow core.

The spherical shape of the present specification does not mean only a perfect spherical shape, and may include a roughly spherical shape. For example, in the hollow metal nanoparticle, the outer surface having a spherical shape may not be smooth, and the radius of curvature in one hollow metal nanoparticle may not be constant.

In the present specification, the hollow means that the core portion of the hollow metal nanoparticle is empty. Further, the hollow may be used as the same meaning as a hollow core.

According to an exemplary embodiment of the present specification, a volume of a hollow of the hollow metal nanoparticle may be 10% to 90% of a total volume of the hollow metal nanoparticle.

According to an exemplary embodiment of the present specification, the shell portion of the hollow metal nanoparticle may include two or more metals selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

According to an exemplary embodiment of the present specification, the polymer electrolyte may include a polyallylamine hydrochloride (PAH)-based material.

According to an exemplary embodiment of the present specification, more than half or more of the hollow metal nanoparticles may maintain a hollow structure at a temperature of 200° C. or more.

According to the carrier-nanoparticle complex according to an exemplary embodiment of the present specification, the hollow metal nanoparticle bonded to the amine group exhibits an effect in that the thermal stability is enhanced. Specifically, according to an exemplary embodiment of the present specification, more than half or more of the hollow metal nanoparticles may maintain a hollow structure at a temperature of 200° C. or more or 300° C. or more.

In addition, according to an exemplary embodiment of the present specification, the hollow metal nanoparticles may maintain a hollow structure at a temperature of 800° C. or less. In addition, according to an exemplary embodiment of the present specification, the hollow metal nanoparticles may maintain a hollow structure at a temperature of 600° C. or less or 500° C. or less.

According to an exemplary embodiment of the present specification, the limit temperature at which more than half or more of the hollow metal nanoparticles maintain a hollow structure may be 800° C. Alternatively, according to an exemplary embodiment of the present specification, the limit temperature at which more than half or more of the hollow metal nanoparticles maintain a hollow structure may be 600° C. or 500° C.

According to an exemplary embodiment of the present specification, the carbon-based carrier may include one or more selected from the group consisting of carbon black, carbon nanotube (CNT), graphite, graphene, activated carbon, mesoporous carbon, carbon fiber, and carbon nano wire.

According to an exemplary embodiment of the present specification, the content of the hollow nanoparticles may be 5 wt % to 60 wt % based on the carrier-nanoparticle complex. Specifically, according to an exemplary embodiment of the present specification, the content of the hollow nanoparticles may be 5 wt % to 50 wt % based on the carrier-nanoparticle complex.

When the content of the hollow nanoparticles exceeds the range, an aggregation phenomenon among hollow nanoparticles may occur, thereby leading to a deterioration in the performance.

An exemplary embodiment of the present specification provides a method for preparing the carrier-nanoparticle complex, the method including: a carrier coating step of coating at least one region of a surface of a carbon-based carrier with a polymer electrolyte including one or more amine groups; a solution forming step of forming a solution by adding the carbon-based carrier and two or more metal precursors to a solvent; and a nanoparticle forming step of forming one or more hollow metal nanoparticles supported onto the carrier by adding a reducing agent to the solution.

A method for preparing a carrier-nanoparticle complex according to an exemplary embodiment of the present specification may be prepared by a simple process, and thus has an advantage in that time and costs may be reduced.

According to an exemplary embodiment of the present specification, the coating of the carrier may include a process of stirring an aqueous solution including the polymer electrolyte including one or more amine groups and the carbon-based carrier.

According to an exemplary embodiment of the present specification, the solution in the forming of the solution may further include a capping agent. According to an exemplary embodiment of the present specification, the capping agent may be trisodium citrate.

According to an exemplary embodiment of the present specification, the metal precursor may include a first metal precursor and a second metal precursor, and the molar ratio of the first metal precursor to the second metal precursor may be 1:1 to 1:5. Specifically, the molar ratio of the first metal precursor to the second metal precursor may be 1:2 to 1:4.

When the molar ratio of the first metal precursor to the second metal precursor is out of the range, there occurs a problem in that hollow metal nanoparticles are not formed well.

According to an exemplary embodiment of the present specification, the content of the first metal precursor may be 0.1 mM to 2 mM, and the content of the second metal precursor may be 0.1 mM to 4 mM.

According to an exemplary embodiment of the present specification, the reducing agent may be a strong reducing agent having a standard reduction potential of −0.23 V or less, specifically, −4 V to −0.23 V. Further, the reducing agent is not particularly limited as long as the reducing agent has a reducing power capable of reducing dissolved metal ions to precipitate the metal ions as metal particles.

According to an exemplary embodiment of the present specification, the reducing agent may be at least one selected from the group consisting of $NaBH_4$, $NH_2NH_2$, $LiAlH_4$, and LiBEt3H.

According to an exemplary embodiment of the present specification, the solvent in the forming of the solution may include water. Specifically, according to an exemplary embodiment of the present specification, the solution in the forming of the solution may be an aqueous solution.

Examples of a method for synthesizing a metal nanoparticle include a method for reducing metal ions in a solution by using a reducing agent, a method for synthesizing a metal nanoparticle using gamma-rays, an electrochemical method, and the like, but in the existing methods, it is difficult to synthesize nanoparticles having a uniform size and shape, or it is difficult to economically mass-produce high-quality nanoparticles for various reasons such as problems of environmental pollution, high costs, and the like by using organic solvents. In contrast, the method for preparing a carrier-nanoparticle complex according to an exemplary embodiment of the present specification may solve problems of environmental pollution and high costs because an organic solvent may not be used.

According to an exemplary embodiment of the present specification, the forming of the nanoparticles may be adding the reducing agent under an atmosphere of 10° C. to 80° C. Specifically, according to an exemplary embodiment of the present specification, the forming of the nanoparticles may be adding the reducing agent under an atmosphere of 50° C. to 80° C.

An exemplary embodiment of the present specification provides a catalyst including the carrier-nanoparticle complex.

The carrier-nanoparticle complex according to an exemplary embodiment of the present specification may be used while replacing existing nanoparticles in the field in which nanoparticles may be generally used.

The carrier-nanoparticle complex according to an exemplary embodiment of the present specification has a much smaller size and a wider specific surface area than the nanoparticles in the related art, and thus may exhibit better activity than the nanoparticles in the related art. Specifically, the carrier-nanoparticle complex according to an exemplary embodiment of the present specification may be used in various fields such as a catalyst, drug delivery, and a gas sensor. Specifically, the carrier-nanoparticle complex according to an exemplary embodiment of the present specification may also be used as a catalyst, or as an active material formulation in cosmetics, pesticides, animal nutrients, or food supplements, and may also be used as a pigment in electronic products, optical elements, or polymers.

MODE FOR INVENTION

Hereinafter, the present specification will be described in detail with reference to the Examples for specifically describing the present specification. However, the Examples according to the present specification may be modified in various forms, and it is not interpreted that the scope of the present specification is limited to the Examples described below in detail. The Examples of the present specification are provided to more completely explain the present specification to a person with ordinary skill in the art.

Example 1

A solution, in which 0.05 mmol of $K_2PtCl_4$ as a precursor of a first metal, 0.1 mmol of $NiCl_2$ as a precursor of a second metal, 0.5 mmol of trisodium citrate, and carbon treated with polyallylamine hydrochloride (PAH) were added to 100 ml of distilled water, was stirred for 30 minutes. After the solution was heated to 70° C., 0.5 mmol of a reducing agent $NaBH_4$ dissolved in 5 ml of distilled water was added to the solution, and the resulting mixture was reacted for 2 hours or more. Thereafter, the solution was centrifuged at 14,000 rpm for 20 minutes, and then the precipitate remaining after discarding the supernatant in the upper layer was redispersed in 20 ml of distilled water, and then the centrifuge process was repeated once again to prepare a carbon carrier-nanoparticle complex.

Figure 1:
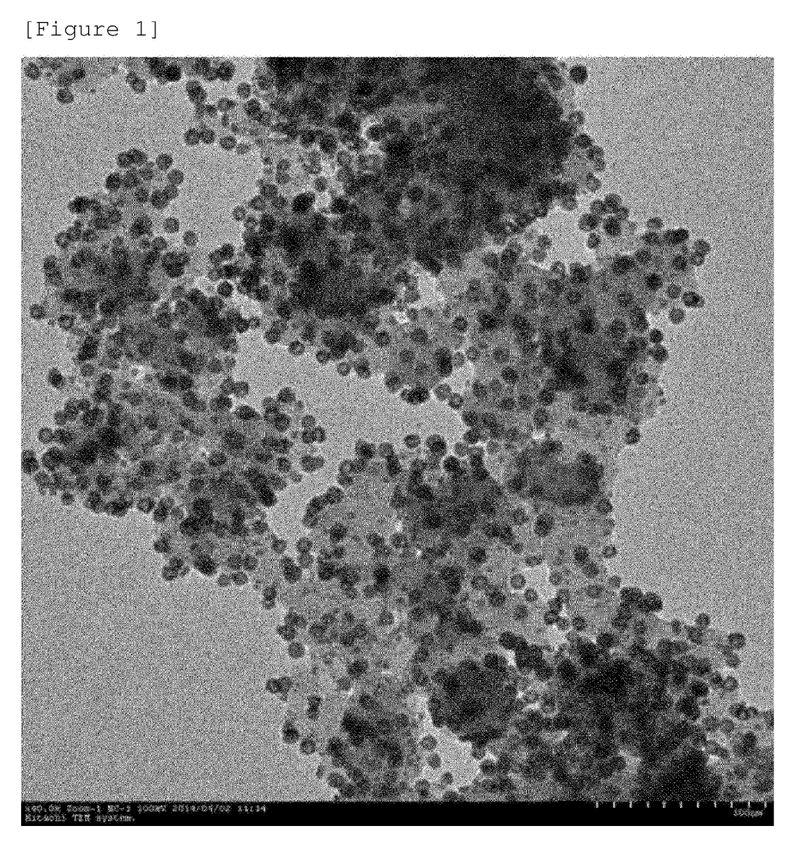
FIG. 1 illustrates a transmission electron microscope (TEM) image of the carrier-nanoparticle complex according to Example 1.

A transmission electron microscope (TEM) image of the carrier-nanoparticle complex according to Example 1 is illustrated in FIG. 1.

Figure 2:
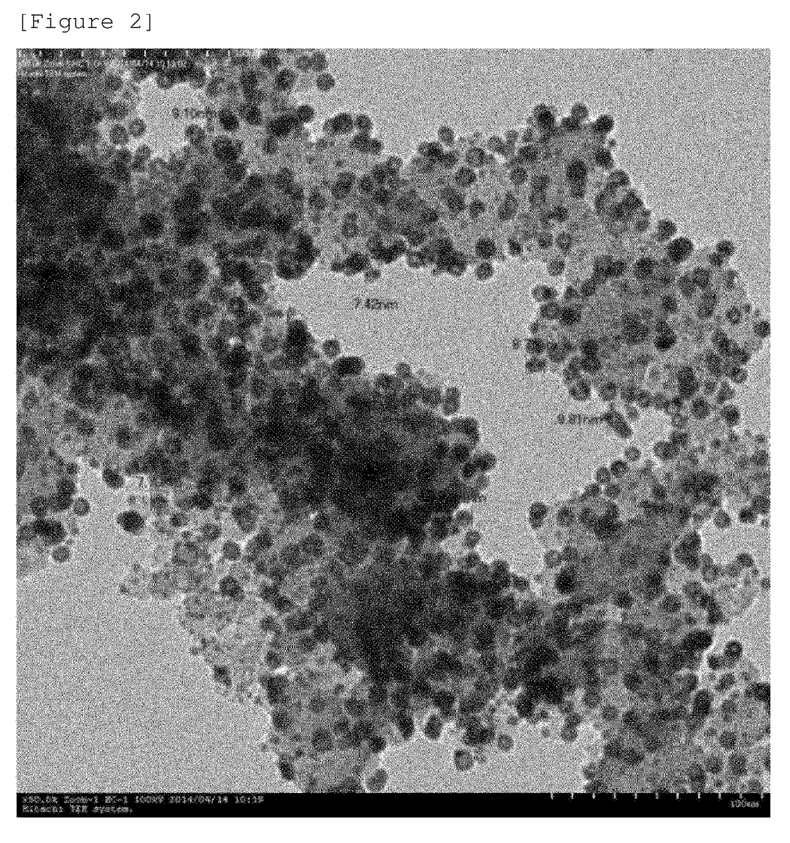
FIG. 2 illustrates a transmission electron microscope (TEM) image of the carrier-nanoparticle complex according to Example 1 after being subjected to heat treatment at 400° C. under an Ar atmosphere for 1 hour.

In order to measure the high-temperature stability of the carrier-nanoparticle complex according to Example 1, a heat treatment was performed at 400° C. under an Ar atmosphere for 1 hour, and a transmission electron microscope (TEM) image after the heat treatment is illustrated in FIG. 2.

It can be confirmed from the image in FIG. 2 that most of the carrier-nanoparticle complex according to Example 1 after the heat treatment maintains a hollow structure.

Figure 5:
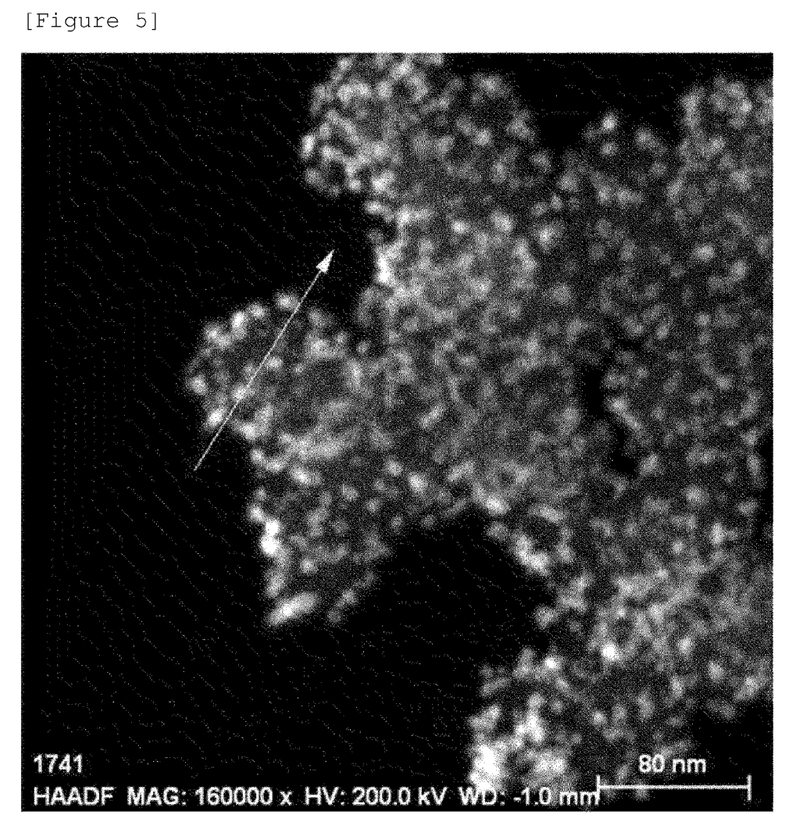
FIG. 5 illustrates the measurement range of the energy dispersive X-ray spectroscopy (EDS) of the carrier-nanoparticle complex according to Example 1 indicated with an arrow mark.

In the carrier-nanoparticle complex according to Example 1, it was confirmed by using energy dispersive X-ray spectroscopy (EDS) that an amine group of PAH was bonded to the hollow metal nanoparticle. Specifically, FIG. 5 illustrates the measurement range of the energy dispersive X-ray spectroscopy (EDS) of the carrier-nanoparticle complex according to Example 1 indicated with an arrow mark. Further, FIG. 6 illustrates the EDS measurement results in the measurement range of the EDS in FIG. 5.

Figure 6:
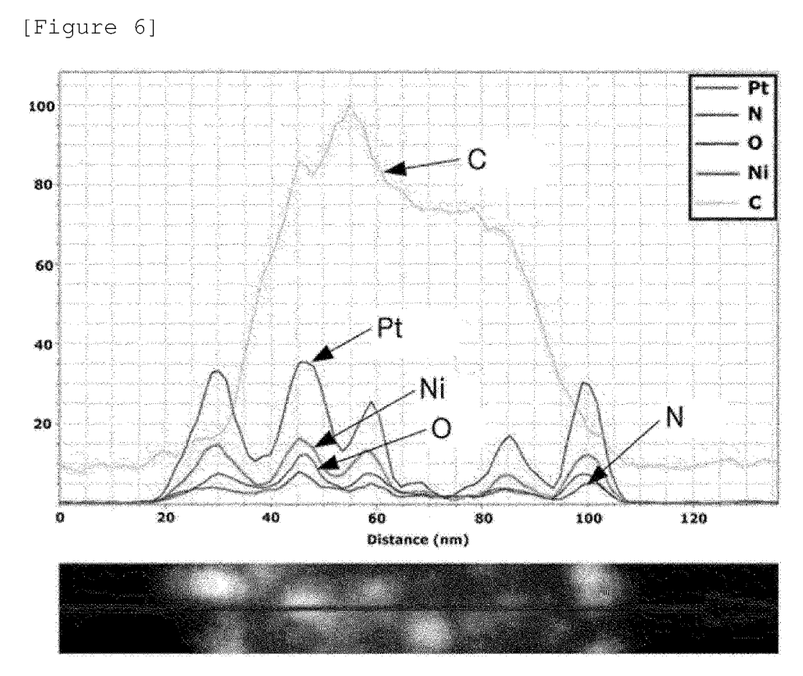
FIG. 6 illustrates the EDS measurement results in the measurement range of the EDS in FIG. 5.

In FIG. 6, it can be confirmed that N of an amine group is distributed on the surface of the carbon carrier and Pt and Ni of the hollow metal nanoparticle are distributed at the same position. Through this, it can be confirmed that in the carrier-nanoparticle complex according to Example 1, an amine group of PAH is boned to the hollow metal nanoparticle to support the hollow metal nanoparticles onto the surface of the carbon carrier.

Comparative Example 1

A solution, in which 0.05 mmol of $K_2PtCl_4$ as a precursor of a first metal, 0.15 mmol of $CoCl_2$ as a precursor of a second metal, 0.5 mmol of trisodium citrate, and acid-treated carbon were added to 40 ml of distilled water, was stirred for 30 minutes. After the solution was heated to 60° C., 0.5 mmol of a reducing agent $NaBH_4$ dissolved in 5 ml of distilled water was added to the solution, and the resulting mixture was reacted for 2 hours or more. Thereafter, the solution was centrifuged at 14,000 rpm for 20 minutes, and then the precipitate remaining after discarding the supernatant in the upper layer was redispersed in 20 ml of distilled water, and then the centrifuge process was repeated once again to prepare a carbon carrier-nanoparticle complex.

Figure 3:
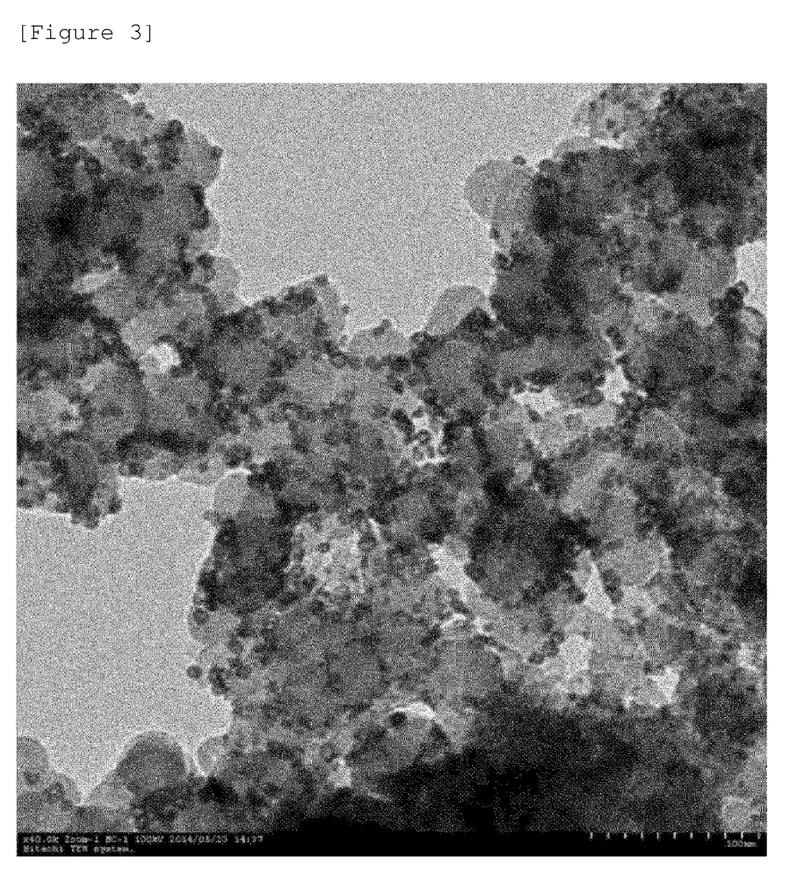
FIG. 3 illustrates a transmission electron microscope (TEM) image of the carrier-nanoparticle complex according to Comparative Example 1.

A transmission electron microscope (TEM) image of the carrier-nanoparticle complex according to Comparative Example 1 is illustrated in FIG. 3.

Figure 4:
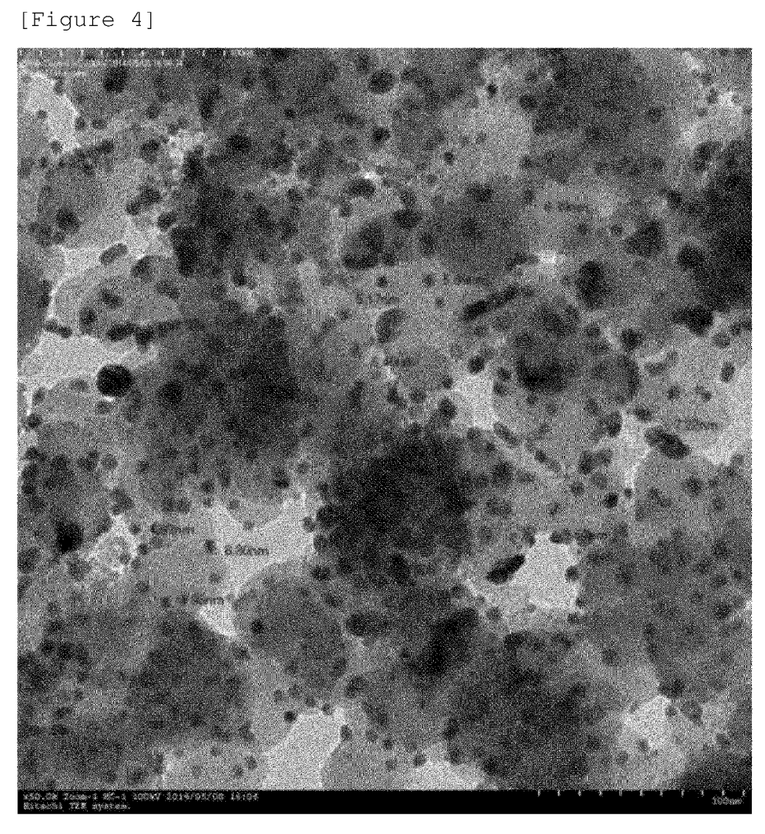
FIG. 4 illustrates a transmission electron microscope (TEM) image of the carrier-nanoparticle complex according to Comparative Example 1 after being subjected to heat treatment at 400° C. under an Ar atmosphere for 1 hour.

In order to measure the high-temperature stability of the carrier-nanoparticle complex according to Comparative Example 1, a heat treatment was performed at 400° C. under an Ar atmosphere for 1 hour, and a transmission electron microscope (TEM) image after the heat treatment is illustrated in FIG. 4.

It can be confirmed from the image in FIG. 4 that in the carrier-nanoparticle complex according to Comparative Example 1 after the heat treatment, most of the hollow structure of the complex is destroyed, and as a result, the inside of the nanoparticle is filled.

The invention claimed is:

1. A carrier-nanoparticle complex comprising:
   one or more hollow metal nanoparticles comprising a hollow core and a shell portion which surrounds the hollow core; and
   a carbon-based carrier that supports the hollow metal nanoparticle,
   wherein at least a portion of a surface of the carrier is coated with a polymer electrolyte comprising one or more amine groups,
   wherein the at least one hollow metal nanoparticle is bonded to the amine group of the polymer electrolyte to be supported on the carbon-based carrier,
   wherein more than half of the hollow metal nanoparticles maintain a hollow structure at a temperature of 200° C. or more.

2. The carrier-nanoparticle complex of claim 1, wherein the shell portion of the hollow metal nanoparticle comprises two or more metals.

3. The carrier-nanoparticle complex of claim 1, wherein the shell portion comprises a first metal and a second metal, and a reduction potential of the second metal is lower than a reduction potential of the first metal.

4. The carrier-nanoparticle complex of claim 1, wherein the hollow metal nanoparticles have an average particle diameter of 30 nm or less.

5. The carrier-nanoparticle complex of claim 1, wherein the hollow metal nanoparticle has a spherical shape.

6. The carrier-nanoparticle complex of claim 1, wherein a volume of a hollow of the hollow metal nanoparticle is 10% to 90% of a total volume of the hollow metal nanoparticle.

7. The carrier-nanoparticle complex of claim 1, wherein the shell portion of the hollow metal nanoparticle comprises two or more metals selected from a group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

8. The carrier-nanoparticle complex of claim 1, wherein the polymer electrolyte comprises a polyallylamine hydrochloride (PAH)-based material.

9. The carrier-nanoparticle complex of claim 1, wherein the carbon-based carrier comprises carbon black, carbon nanotube (CNT), graphite, graphene, activated carbon, mesoporous carbon, carbon fiber, carbon nano wire, or mixtures thereof.

10. The carrier-nanoparticle complex of claim 1, wherein a content of the hollow nanoparticles is 5 wt % to 60 wt % based on the carrier-nanoparticle complex.

11. A method for preparing the carrier-nanoparticle complex of claim 1, the method comprising:

coating the surface of the carbon-based carrier with the polymer electrolyte comprising one or more amine groups;

forming a solution by adding the carbon-based carrier and two or more metal precursors to a solvent; and forming one or more hollow metal nanoparticles supported onto the carrier by adding a reducing agent to the solution.

12. The method of claim 11, wherein the coating of the carrier comprises a process of stirring an aqueous solution comprising the polymer electrolyte comprising one or more amine groups and the carbon-based carrier.

13. The method of claim 11, wherein the solution further comprises a capping agent.

14. The method of claim 11, wherein the metal precursor comprises a first metal precursor and a second metal precursor in a molar ratio of the first metal precursor to the second metal precursor is 1:1 to 1:5.

15. The method of claim 11, wherein the solvent of the solution comprises water.

16. The method of claim 11, wherein the nanoparticles are formed by adding the reducing agent under an atmosphere of 10° C. to 80° C.

17. A catalyst comprising the carrier-nanoparticle complex of claim 1.

* * * * *